(12) United States Patent
Kishine et al.

(10) Patent No.: US 10,931,942 B2
(45) Date of Patent: Feb. 23, 2021

(54) EVALUATION SYSTEM AND EVALUATION METHOD

(71) Applicant: FUJIFILM Corporation, Tokyo (JP)

(72) Inventors: Yasunobu Kishine, Saitama (JP); Tatsuro Iwasaki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 40 days.

(21) Appl. No.: 16/351,434

(22) Filed: Mar. 12, 2019

(65) Prior Publication Data

US 2019/0215511 A1 Jul. 11, 2019

Related U.S. Application Data

(63) Continuation of application No. PCT/JP2017/032684, filed on Sep. 11, 2017.

(30) Foreign Application Priority Data

Sep. 14, 2016 (JP) .............................. JP2016-179765

(51) Int. Cl.
*H04N 17/00* (2006.01)
*H04N 17/02* (2006.01)
(Continued)

(52) U.S. Cl.
CPC ............. *H04N 17/002* (2013.01); *G06K 9/20* (2013.01); *G06T 7/0002* (2013.01); *G06T 11/60* (2013.01);
(Continued)

(58) Field of Classification Search
CPC ........ H04N 7/002; H04N 5/232; H04N 17/02; G06K 9/20; G06K 2209/01; G06T 7/0002;
(Continued)

(56) References Cited

U.S. PATENT DOCUMENTS

| 7,761,257 B2 | 7/2010 | Matsuzawa |
| 8,532,371 B2 | 9/2013 | Agarwal et al. |

(Continued)

FOREIGN PATENT DOCUMENTS

| CN | 1867082 | 11/2006 |
| CN | 101303269 | 11/2008 |

(Continued)

OTHER PUBLICATIONS

"International Search Report (Form PCT/ISA/210) of PCT/JP2017/032684," dated Nov. 21, 2017, with English translation thereof, pp. 1-5.

(Continued)

*Primary Examiner* — Leon Viet Q Nguyen
(74) *Attorney, Agent, or Firm* — JCIPRNET

(57) ABSTRACT

An evaluation system includes an input unit that inputs a test chart image acquired by imaging a test chart including a plurality of characters, an evaluation unit that evaluates performance of an imaging unit using the test chart image, an image generation unit that generates an evaluation image representing an evaluation of the evaluation unit at each position on the test chart image with a color, and a display unit that displays the evaluation image along with the test chart image or in a superimposed manner on the test chart image.

16 Claims, 13 Drawing Sheets

(51) Int. Cl.
  *H04N 5/232* (2006.01)
  *G06K 9/20* (2006.01)
  *G06T 7/00* (2017.01)
  *G06T 11/60* (2006.01)
  *H04N 9/04* (2006.01)

(52) U.S. Cl.
  CPC ......... *H04N 5/232* (2013.01); *H04N 5/23212* (2013.01); *H04N 17/02* (2013.01); *G06K 2209/01* (2013.01); *G06T 2207/10024* (2013.01); *G06T 2207/30168* (2013.01); *H04N 9/0451* (2018.08)

(58) Field of Classification Search
  CPC ........... G06T 11/60; G06T 2207/10024; G06T 2207/30168
  See application file for complete search history.

(56) References Cited

U.S. PATENT DOCUMENTS

| | | | |
|---|---|---|---|
| 2002/0044275 A1* | 4/2002 | Kitabayashi | G01M 11/0242 356/124 |
| 2004/0179191 A1 | 9/2004 | Kitabayashi et al. | |
| 2006/0194131 A1* | 8/2006 | Kojima | G03G 5/08228 430/56 |
| 2006/0279633 A1 | 12/2006 | Oka | |

FOREIGN PATENT DOCUMENTS

| | | |
|---|---|---|
| CN | 103493065 | 1/2014 |
| CN | 104677853 | 6/2015 |
| CN | 105763869 | 7/2016 |
| JP | 2002202218 | 7/2002 |
| JP | 2006279865 | 10/2006 |
| JP | 2008035370 | 2/2008 |
| JP | 2015082242 | 4/2015 |

OTHER PUBLICATIONS

"Written Opinion of the International Searching Authority (Form PCT/ISA/237) of PCT/JP2017/032684," dated Nov. 21, 2017, with English translation thereof, pp. 1-7.

"Office Action of China Counterpart Application", dated May 9, 2020, with English translation thereof, pp. 1-12.

"Office Action of China Counterpart Application", dated Nov. 2, 2020, with English translation thereof, pp. 1-9.

* cited by examiner

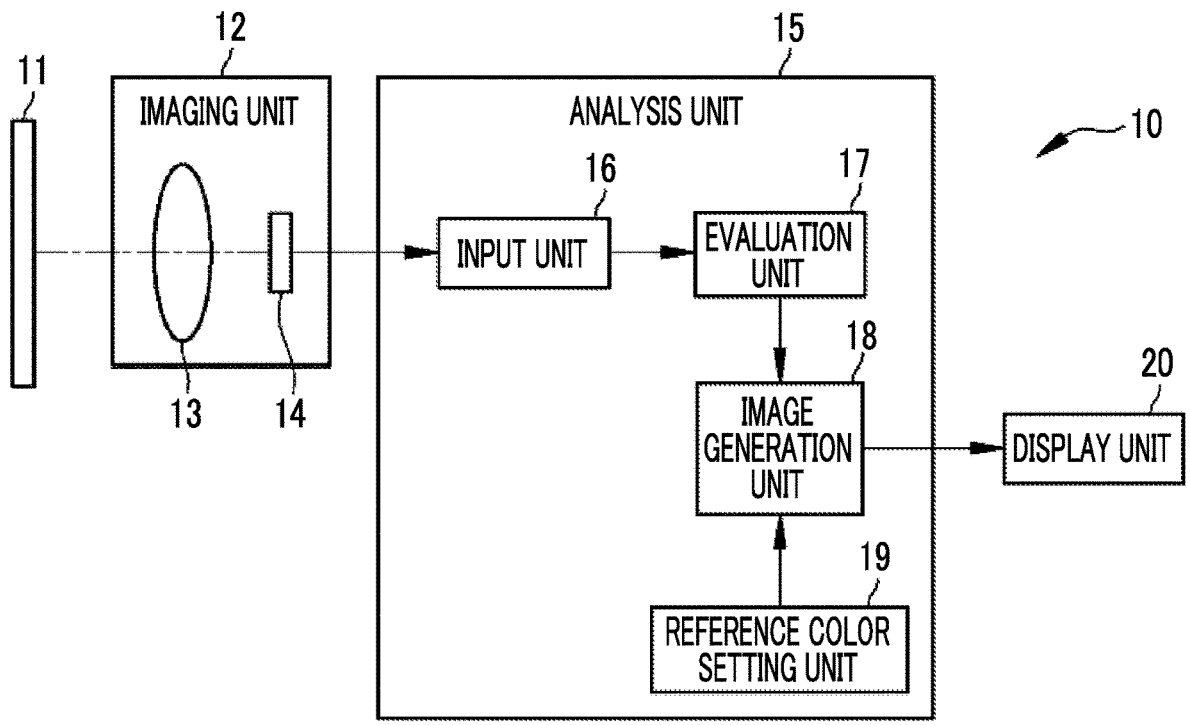

| EXAMPLE OF CHARACTERS | DISPLAY COLOR | OCR |
|---|---|---|
| ABCDE | RED | A |
| ABCDE | ↑ | A |
| ABCDE | YELLOW | B |
| ABCDE | ↓ | C |
| ABCDE | BLUE | C | ured using an image (hereinafter, referred to as a test chart image) that is acquired by imaging a test chart (JP2015-082242A).

EVALUATION SYSTEM AND EVALUATION METHOD

CROSS-REFERENCE TO RELATED APPLICATIONS

This application is a Continuation of PCT International Application No. PCT/JP2017/032684 filed on 11 Sep. 2017, which claims priority under 35 U.S.C § 119(a) to Japanese Patent Application No. 2016-179765 filed on 14 Sep. 2016. The above application is hereby expressly incorporated by reference, in its entirety, into the present application.

BACKGROUND OF THE INVENTION

1. Field of the Invention

The present invention relates to an evaluation system and an evaluation method for evaluating the performance of a lens and the like.

2. Description of the Related Art

An imaging device that images a subject using an imaging lens and an image sensor is widely used. In addition, a system that incorporates the imaging device, performs analysis and the like on an image imaged by the imaging device, and uses the result for its operation is widely used. The image acquired in such an imaging device or the system (hereinafter, referred to as the imaging device or the like) incorporating the imaging device is typically evaluated using an image (hereinafter, referred to as a test chart image) that is acquired by imaging a test chart (JP2015-082242A).

SUMMARY OF THE INVENTION

Resolution is one important image evaluation standard. However, in the method of evaluation using the test chart image in the related art, measurement locations are discrete in the image, and an arbitrary location cannot be evaluated. In addition, evaluation may only be performed in a specific direction such as the horizontal direction or the vertical direction of the image. Thus, the evaluation obtained using the method in the related art may not have a good correlation with the actual performance of the imaging device or the like.

For example, in the case of acquiring an image for display using the imaging device or the like, it is not unusual that there is a great difference between visual sensory evaluation and the evaluation obtained in the related art using the test chart image. In addition, in a case where the image acquired using the imaging device or the like is used in optical character recognition (hereinafter, referred to as OCR), the correlation between the evaluation obtained in the related art using the test chart image and the actual character recognition ratio is generally bad.

In addition, in the related art, in the case of presenting the evaluation, the presentation is typically provided in the format of a graph or the like in a specific direction of the evaluation of the resolution or the like. Thus, it is difficult to understand the correspondence between the test chart image and the graph representing the evaluation result, thereby posing a problem in that a comparison itself between the actual performance of the imaging device or the like and the evaluation obtained using the method in the related art is difficult.

An object of the present invention is to provide an evaluation system and an evaluation method that favorably represent the actual performance of an imaging device or the like and present an understandable evaluation result.

An evaluation system of the present invention comprises an input unit, an evaluation unit, and a display unit. The input unit inputs a test chart image acquired by imaging a test chart including a plurality of characters. The evaluation unit evaluates performance of an imaging unit using the test chart image. An image generation unit generates an evaluation image representing an evaluation of the evaluation unit at each position on the test chart image with a color. The display unit displays the evaluation image along with the test chart image or in a superimposed manner on the test chart image.

It is preferable that the evaluation unit evaluates the performance of the imaging unit using a character that has a constant line thickness among the characters included in the test chart image.

It is preferable that the evaluation unit evaluates the performance of the imaging unit in a case where the plurality of characters included in the test chart image are random.

It is preferable that the evaluation unit evaluates the performance of the imaging unit in a case where the test chart in the test chart image is in a gray scale.

It is preferable that the evaluation unit evaluates a resolution of the imaging unit.

It is preferable that the evaluation image shows a part having a higher resolution than a reference resolution or a part having a lower resolution than the reference resolution by representing a part having the reference resolution with a specific color and representing the part having the higher resolution than the reference resolution or the part having the lower resolution than the reference resolution with a color different from the specific color.

It is preferable that the image generation unit sets the reference resolution based on a character recognition ratio of optical character recognition software, and the evaluation image represents at least a part in which a character is recognizable, and a part in which a character is not recognizable with different colors in a case of recognizing the characters included in the test chart image using the optical character recognition software.

It is preferable that the evaluation unit evaluates chromatic performance of a lens included in the imaging unit.

It is preferable that the image generation unit generates the evaluation image in which color bleeding caused by a chromatic aberration at each position on the test chart image is represented as an image.

It is preferable that the image generation unit generates the evaluation image that represents magnitudes of an axial chromatic aberration and a lateral chromatic aberration with a color with respect to an image height.

It is preferable to further comprise an imaging unit that images the test chart image to be input to the input unit.

It is preferable to further comprise the test chart.

It is preferable that the characters included in the test chart have a constant line thickness.

It is preferable that the plurality of characters included in the test chart are random.

It is preferable that the color of the plurality of characters included in the test chart is a single color.

An evaluation method of the present invention comprises a step of inputting a test chart image acquired by imaging a test chart including a plurality of characters by an input unit, a step of evaluating performance of an imaging unit using the test chart image by an evaluation unit, a step of generating an evaluation image representing an evaluation of the evaluation unit at each position on the test chart image with a color by an image generation unit, and a step of displaying the evaluation image along with the test chart image or in a superimposed manner on the test chart image by a display unit.

The present invention can evaluate performance in any direction at any location by using a test chart including a plurality of characters and displays an evaluation image representing an evaluation with a color along with a test chart image or in other manners. Consequently, an evaluation result that favorably represents actual performance of an imaging device or the like can be presented in an understandable manner.

BRIEF DESCRIPTION OF THE DRAWINGS

FIG. 1 is a block diagram of an evaluation system.

FIG. 2 is a schematic diagram of a test chart.

DESCRIPTION OF THE PREFERRED EMBODIMENTS

First Embodiment

Figure 3:
FIG. 3 is an example of characters on the test chart.

As illustrated in FIG. 1, an evaluation system 10 comprises a test chart 11, an imaging unit 12, an analysis unit 15, and a display unit 20.

The test chart 11 includes at least a plurality of characters as a chart used for evaluation. In the present specification, the character is, for example, an alphabet, a number, hiragana, katakana, or kanji and is a symbol, a sign, or a figure configured with a combination of dots or lines. Therefore, the character includes a special symbol, sign, figure, or the like (for example, a symbol, a sign, or a figure that is used in only an expression) that does not have a meaning alone or in combination as a so-called word.

In the present embodiment, the test chart 11 is formed using a character string consisting of a plurality of alphabets as illustrated in FIG. 2. In FIG. 2, the character string constituting the test chart 11 is an arrangement of alphabets not having a linguistic meaning, but may be a sentence or the like having a linguistic meaning. In addition, in FIG. 2, the test chart 11 is configured using a plurality of types of characters. However, depending on the content of evaluation (such as whether or not the evaluation result affects the directivity or the density of the characters), the test chart 11 may be configured using a plurality of characters of one type.

As illustrated in FIG. 3, characters (for example, an Arial font or a boldface of other fonts) having an approximately constant point or line thickness D1 is used in the plurality of characters constituting the test chart 11. In the plurality of characters constituting the test chart 11, the size of each character is an approximately constant size. That is, the test chart 11 is regarded as having a sufficiently insignificant effect on at least the evaluation result because an evaluation method that reduces the anisotropy of the character itself constituting the test chart 11 and, even in a case where anisotropy is present, averages the inside of a specific area SP (refer to FIG. 5) in the case of evaluating the imaging unit 12 is used.

Furthermore, the plurality of characters included in the test chart 11 are approximately random as a whole of the test chart 11. The term "random" means that there is no deviation with respect to directivity (the directivity of the character itself and not the directivity of the character arrangement) and density, and consequently, the directivity and the density are regarded as being almost uniform. That is, while a different character or a combination of characters (a so-called word or the like) is used at each position in a case where the test chart 11 is locally seen, the whole of the test chart 11 is regarded as being uniform.

For example, in a case where there is a deviation such that "- (hyphen)" is densely located in a certain part of the test chart 11, and "| (vertical line)" is densely located in another certain part, there may be a difference in evaluation result between evaluation of a resolution or the like using the part in which "- (hyphen) having horizontal directivity)" is densely located, and evaluation of the resolution or the like using the part in which "| (vertical line)" having vertical directivity is densely located. However, since characters having a constant thickness are approximately randomly arranged in the test chart 11 as a whole, and such a deviation is prevented, any part of the test chart 11 used for evaluation has a sufficiently insignificant effect on the evaluation result.

Besides, regarding the color of the test chart 11, the color of the plurality of characters included in the test chart 11 is a single color. That is, the test chart 11 is monochrome, and the characters of the test chart 11 are configured in one color different from a background (a part in which a character is not present). For example, the background is in one color of white, and the characters are in one color of black. Therefore, since the test chart 11 is uniform as a whole with respect to color, any part of the test chart 11 used in the case of evaluation with respect to color (for example, in the case of evaluating chromatic performance such as a chromatic aberration) does not affect the result of evaluation.

The imaging unit 12 is a so-called digital camera that acquires a test chart image 26 (refer to FIG. 5) by imaging the test chart 11, and includes an imaging lens 13, an image sensor 14, a control unit (not illustrated) controlling the imaging lens 13, the image sensor 14, and the like, and an image processing unit (not illustrated). The imaging lens 13 or the image sensor 14 included in the imaging unit 12 is a component constituting an evaluation target imaging device or the like or is the evaluation target imaging device or the like itself and can be individually replaced. Therefore, in the evaluation system 10, the evaluation target imaging device or the like is changed by replacing the imaging lens 13 or the image sensor 14.

The image processing unit included in the imaging unit 12 selectively performs, as necessary, one or a plurality of image processing such as a demosaicing process (referred to as a coloring process or demosaicing), an edge highlight process, a contrast highlight process, a noise reducing process, a light intensity correction process, a distortion correction process, or various aberration correction processes for a lateral chromatic aberration, an axial chromatic aberration, and the like on an image or a signal output by the image sensor 14. In addition, the imaging unit 12 can turn OFF the various image processing. For example, in a case where only the imaging lens 13 is the evaluation target, a so-called RAW image is output as the test chart image 26 without performing the various image processing. In addition, in a case where parameters of the various image processing are adjusted using the imaging lens 13 and the image sensor 14 having known performance or the like, the evaluation system 10 can evaluate the performance of image processing of the imaging unit 12 (the performance of image processing with the adjusted parameters or a combination of the image processing with the adjusted parameters and other image processing).

The analysis unit 15 has an input unit 16, an evaluation unit 17, an image generation unit 18, and a reference color setting unit 19. For example, the analysis unit 15 is a so-called computer. Thus, for example, the input unit 16, the evaluation unit 17, the image generation unit 18, and the reference color setting unit 19 are programs, operation devices such as central processing units (CPU), memories, and other electronic circuits.

The input unit 16 inputs the test chart image 26, which is acquired by imaging the test chart 11 including the plurality of characters, into the evaluation unit 17. The input unit 16 acquires the test chart image 26 from the imaging unit 12. The test chart image 26 may consist of a plurality of images. For example, in a case where the image sensor 14 has a color filter of any of red, green, and blue (RGB) in each pixel, and the imaging unit 12 outputs a red image (R image), a green image (G image), and a blue image (B image) acquired by imaging the test chart 11 in pixels of each color, the input unit 16 may input the R image, the G image, the B image, or a combination of two or more of the R image, the G image, and the B image into the evaluation unit 17 as one test chart image 26. Hereinafter, the test chart image 26 will be regarded as one image unless otherwise a particular description is needed.

The evaluation unit 17 evaluates the performance of the imaging unit 12 using the test chart image 26. The performance of the imaging unit 12 is the imaging performance of the imaging lens 13 and the image sensor 14, which are components (or the evaluation target imaging device or the like itself) constituting the evaluation target imaging device or the like or the imaging performance of the imaging lens 13 or the image sensor 14 and is, for example, the resolution, sharpness, or various aberrations such as a chromatic aberration. In the present embodiment, the evaluation unit 17 evaluates the resolution for each position on the test chart image 26.

The evaluation unit 17 evaluates the performance of the imaging unit 12 using at least a character having a constant line thickness among the characters included in the test chart image 26. In the present embodiment, characters having the approximately constant point or line thickness D1 are used in the test chart 11. Thus, the evaluation unit 17 can use all characters included in the test chart image 26 for evaluation of the performance of the imaging unit 12.

In addition, the evaluation unit 17 evaluates the performance of the imaging unit 12 in a case where the plurality of characters included in the test chart image 26 are random. Therefore, in a case where a character in a part used in the case of evaluating the performance of the imaging unit 12 by the evaluation unit 17 is not random, error may be included in the evaluation of the performance of the imaging unit 12. In the present embodiment, in the test chart 11, the plurality of characters included in the test chart 11 are approximately random as a whole of the test chart 11. Thus, the evaluation unit 17 can evaluate the performance of the imaging unit 12 using any part in the test chart image 26.

In addition, the evaluation unit 17 can properly evaluate the performance of the imaging unit 12 particularly in a case where the test chart 11 (that is, the plurality of characters) in the test chart image 26 is in a gray scale. Therefore, in a case or the like where the test chart 11 in the test chart image 26 has a different color for each position, error may be included in the evaluation result in a case where the evaluation unit 17 evaluates the imaging unit 12 with respect to color. In the present embodiment, the background of the test chart 11 is in one color of white, and the characters are in one color of black. Thus, the test chart 11 in the test chart image 26 is in at least a gray scale. Thus, the evaluation unit 17 can evaluate the imaging unit 12 with respect to color using any part in the test chart image 26.

The image generation unit 18 generates an evaluation image 31 (refer to FIG. 6) that represents the evaluation (for example, the value of the resolution) of the evaluation unit 17 at each position on the test chart image 26 with a color. In the present embodiment, since the evaluation unit 17 evaluates the resolution, the evaluation image 31 shows a part having a higher resolution than a reference resolution or a part having a lower resolution than the reference resolution by representing a part having the reference resolution with a specific color and representing the part having a higher resolution than the reference resolution or the part having a lower resolution than the reference resolution with a color different from the specific color. Specifically, the image generation unit 18 sets a color to be associated with the evaluation of the evaluation unit 17 in accordance with a setting of the reference color setting unit 19.

The reference color setting unit 19 sets a color as a reference (hereinafter, referred to as a reference color) among colors to be associated with the evaluation (for example, the value of the resolution) of the evaluation unit 17 in a case where the image generation unit 18 generates the evaluation image 31. In addition, the reference color setting unit 19 sets a color (hereinafter referred to as a first color) to be associated in a case where the evaluation exceeds the reference, and a color (hereinafter, referred to as a second color) in a case where the evaluation is below the reference as at least colors that may be distinguished from each other. Simply speaking, the reference color setting unit 19 sets a color scale 32 (refer to FIG. 6) of the evaluation image 31 by setting the reference color, the first color, and the second color.

For example, the reference color is yellow. In addition, in a case where the reference color is yellow, for example, the first color is a red-based color, and the second color is a blue-based color. The red-based color is a set of colors acquired by gradually increasing a red component and gradually decreasing a blue component based on the value of the evaluation from yellow, which is the reference color, to red. For example, orange and red are red-based colors. The blue-based color is a set of colors acquired by gradually increasing a blue component and gradually decreasing a red component based on the value of the evaluation from yellow, which is the reference color, to blue. For example, green and blue are blue-based colors.

The reference color setting unit 19 sets the correspondence between the reference color and the evaluation such that the actual performance of the imaging device or the like is favorably represented. Specifically, in the present embodiment, the direct and actual evaluation of the imaging unit 12 to be obtained by a user is not the resolution itself but whether or not characters can be recognized using specific OCR software. Thus, the reference color setting unit 19 sets the reference resolution and a color corresponding to the reference resolution based on the character recognition ratio of the specific OCR software. Specifically, a resolution at which the character recognition ratio in the case of performing character recognition using the specific OCR software is equal to a specific value (for example, 80%) is associated with the reference color. Accordingly, consequently, the image generation unit 18 sets the reference resolution and the color corresponding to the reference resolution based on the character recognition ratio of the specific OCR software, and the evaluation image 31 represents at least a part in which characters can be recognized, and a part in which characters cannot be recognized with different colors in the case of recognizing the characters included in the test chart image 26 using the specific OCR software. In the case of using other OCR software, the resolution at which the character recognition ratio is greater than or equal to the specific value changes depending on the performance of the OCR software. Thus, for example, the reference color setting unit 19 changes the resolution to be associated with the reference color for each OCR software.

The reference color setting unit 19 is a storage device such as a memory that temporarily or permanently stores the reference color, the first color, the second color, and the correspondence between each color and the value of the evaluation of the evaluation unit 17, or is a user interface that appropriately inputs the reference color, the first color, the second color, and the correspondence between each color and the value of the evaluation of the evaluation unit 17 into the image generation unit 18.

The display unit 20 displays the evaluation image 31 along with the test chart image 26 or in a superimposed manner on the test chart image 26. The display unit 20 is a so-called monitor such as a liquid crystal display.

Figure 4:
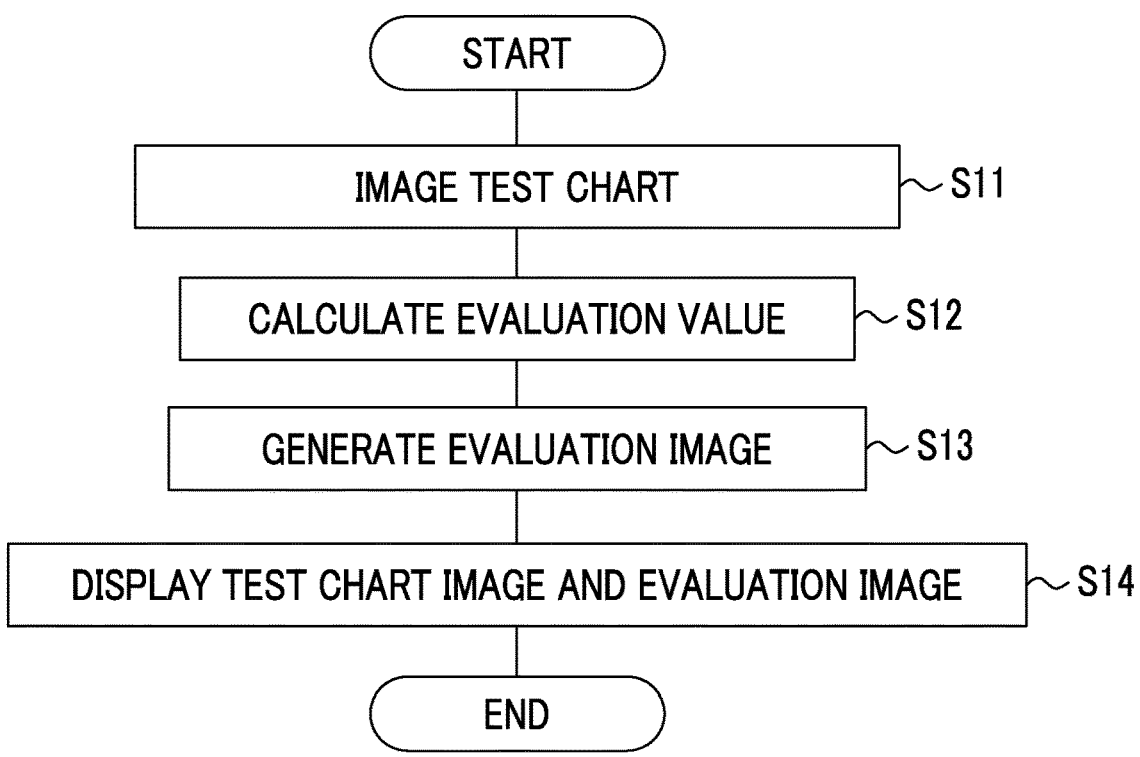
FIG. 4 is a flowchart illustrating an action of the evaluation system.

Hereinafter, an action of the evaluation system 10 will be described in accordance with a flowchart in FIG. 4. First, the imaging lens 13 or the like which is the evaluation target is attached to the imaging unit 12, and the test chart 11 is imaged (S11). Accordingly, the imaging unit 12 acquires the test chart image 26. In the case of imaging the test chart 11, the imaging unit 12 is focused on the test chart 11 by adjusting its distance to the test chart 11 or using an auto focus function of the imaging lens 13. While the imaging unit 12 images the test chart 11 with the center of the test chart 11 approximately in its front, precise positioning or the like is not needed. The reason is that the characters of the test chart 11 are random and are uniform with respect to color.

Figure 5:
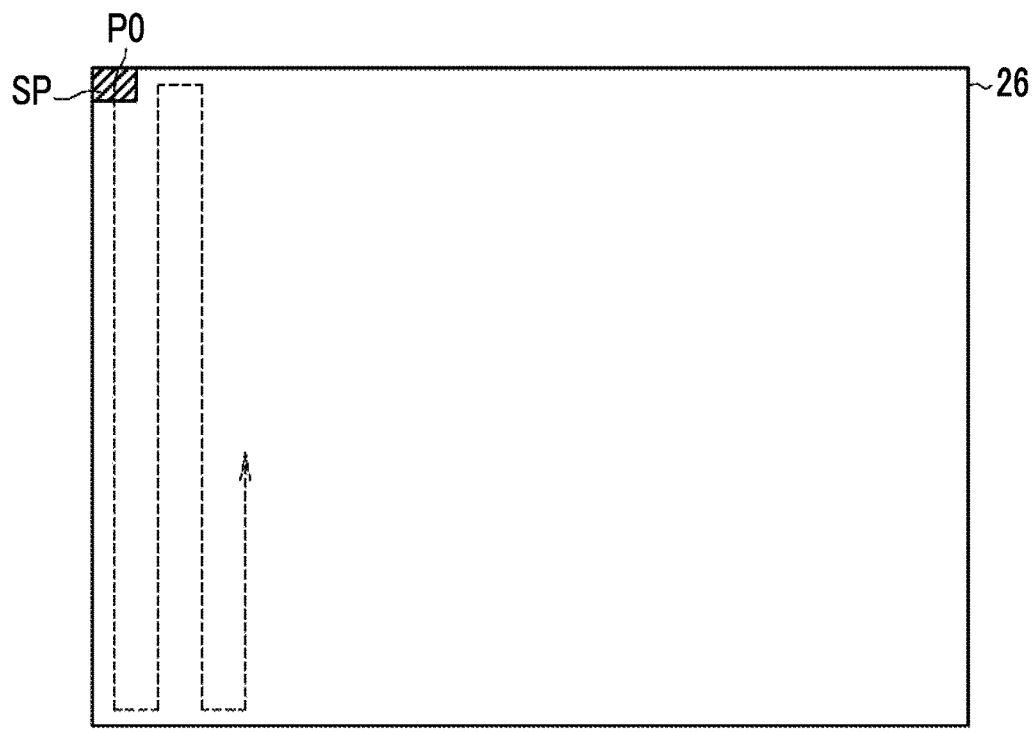
FIG. 5 is a descriptive diagram illustrating an evaluation method.

In a case where the imaging unit 12 acquires the test chart image 26, the evaluation unit 17 evaluates the performance of the imaging unit 12 using the test chart image 26 (S12). Specifically, as illustrated in FIG. 5, from the test chart image 26, the evaluation unit 17 cuts out the area SP that has a constant size and includes, at its center, a positional coordinate (hereinafter, referred to as an evaluation position) P0 at which the resolution is calculated. The resolution at the evaluation position P0 is calculated using the image of the area SP. Furthermore, for example, the evaluation unit 17 scans the position of the area SP on the test chart image 26 as illustrated by a broken arrow. Consequently, the resolution is calculated in almost the whole area of the test chart image 26.

For example, a contrast method, a root mean square method, or a derivation method is known as a resolution calculation method. In the present embodiment, the evaluation unit 17 calculates the resolution using the contrast method. Specifically, first, an average value Aave of pixel values of the whole image of the cut area SP is calculated. Then, in the image of the area SP, an average value Wave of pixel values greater than or equal to the average value Aave is calculated. In addition, in the image of the area SP, an average value Bave of pixel values less than or equal to the average value Aave is calculated. A resolution Rpos at the evaluation position P0 is calculated in accordance with Rpos=(Wave−Bave)/(Wave+Bave).

Figure 6:
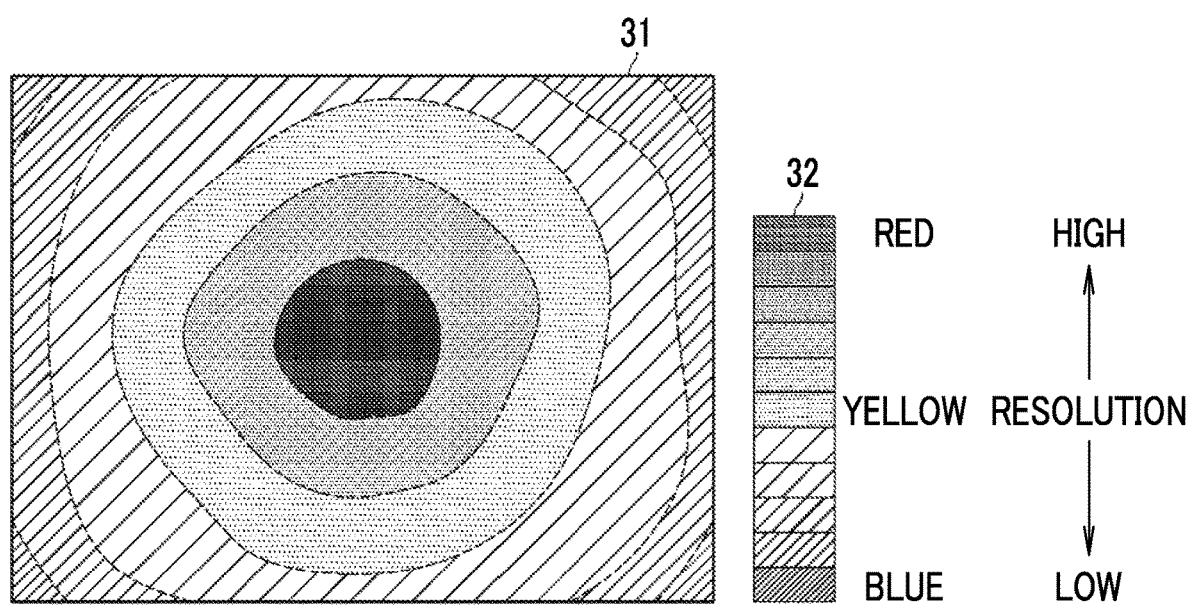
FIG. 6 is an evaluation image in the case of evaluating a resolution.
Figures 7, 8:
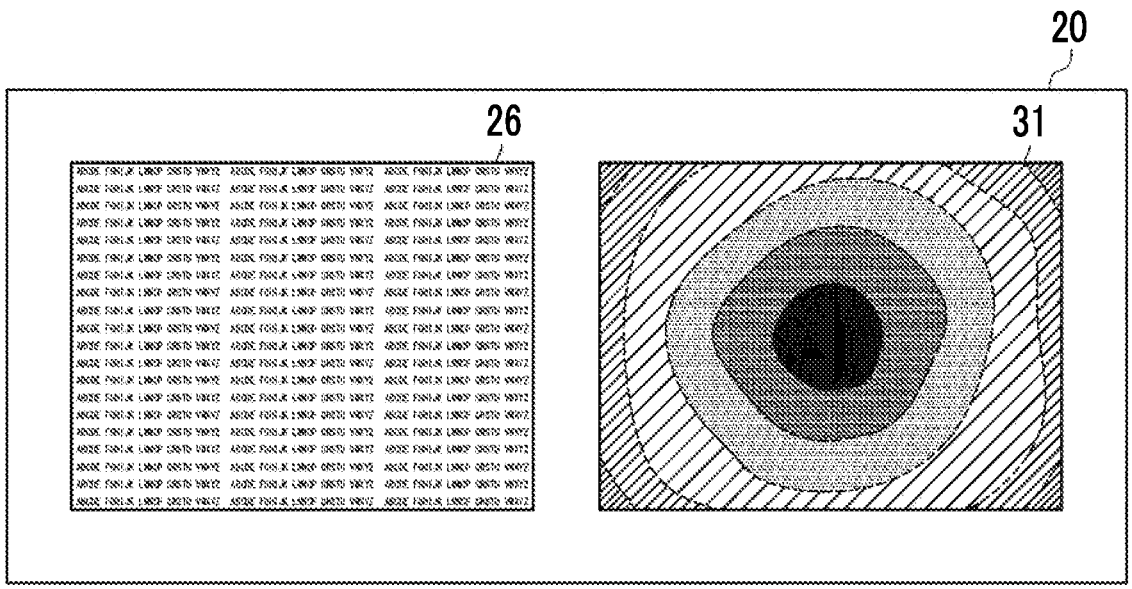
FIG. 7 is a descriptive diagram illustrating a correspondence among characters on a test chart image, the color of the evaluation image, and an evaluation related to character recognition using OCR software.
FIG. 8 is a descriptive diagram illustrating an example of display in a display unit.

In a case where the evaluation unit 17 calculates the resolution which is the evaluation of the imaging unit 12 in the above manner, the image generation unit 18 generates the evaluation image 31 (S13). As illustrated in FIG. 6, the evaluation image 31 is an image in which a pixel at a position corresponding to each evaluation position P0 of the test chart image 26 is set to have the resolution which is the evaluation of the evaluation unit 17, and a color set in the color scale 32 set by the reference color setting unit 19. In the present embodiment, as illustrated in FIG. 6 and FIG. 7, a pixel at a position at which the character recognition ratio is equal to the specific value in the case of using the OCR software is yellow which is the reference color. In addition, a pixel at a position at which the character recognition ratio exceeds the specific value has the red-based color corresponding to the resolution at the position. In addition, a pixel at a position at which the character recognition ratio is below the specific value has the blue-based color corresponding to the resolution at the position. Therefore, in the evaluation image 31, it is clearly seen that characters can be stably recognized by the OCR software in the area of yellow, which is the reference color, and the red-based color, and conversely, character recognition accuracy of the OCR software is low in the area of the blue-based color.

In FIG. 7, "example of characters" is an example of characters on the test chart image 26, and "display color" is the color of display based on the color scale 32 in the evaluation image 31. In addition, in FIG. 7, "OCR" is an evaluation representing a summary of the character recognition ratio in the case of using the OCR software and has three levels of "A", "B", and "C". The evaluation "A" represents that the character recognition ratio of the OCR software exceeds the specific value, and almost all characters can be correctly recognized (read by the OCR software). The evaluation "B" represents that the character recognition ratio of the OCR software is approximately equal to the specific value, and while a part of characters may be erroneously recognized, or a part of characters may not be recognized as a character, most of the characters can be correctly recognized (almost read by the OCR software). The evaluation "C" represents that the character recognition ratio of the OCR software is below the specific value, and while a part of characters may be correctly recognized, many characters cannot be recognized, or many recognized characters are erroneously recognized (visually read but not read by the OCR software).

In a case where the image generation unit 18 generates the evaluation image 31, the display unit 20 displays the evaluation image 31 on its display screen along with the test chart image 26 as illustrated in FIG. 8 (S14).

As described above, the evaluation system 10 presents the evaluation result of the performance of the imaging unit 12 in the format of the evaluation image 31. Thus, a comparison or the like between a visual sensory evaluation of the test chart image 26 and the evaluation of the evaluation system 10 can be more easily made than a case where the evaluation result is presented in the format of graph or the like as in the related art. In addition, the resolution at "any position" of the test chart image 26 can be easily found. From such points, the display of the evaluation result of the evaluation system 10 is more understandable than that in the related art.

In addition, for example, the user who tries to perform character recognition using the OCR software desires to find the evaluation such as the resolution of the imaging lens 13 or the like, but the evaluation is a so-called intermediate evaluation for finding whether or not characters can be eventually recognized using the OCR software. It is more favorable to find the evaluation as to whether or not characters can be recognized using the OCR software in a more direct form.

In the related art, in the case of presenting the graph of the resolution in a specific direction at any position, a determination as to whether or not a character at the position can be recognized by the OCR software has to be performed by considering graphs of the resolution in two directions. Therefore, the actual evaluation as to whether or not a character at a certain position on the test chart image 26 can be recognized is not directly acquired.

In the evaluation image 31, the evaluation system 10 displays the evaluation of the resolution with a color in association with the character recognition ratio in the case of using the OCR software. Thus, the character recognition ratio in the case of using the OCR software can be more directly found than that in the related art.

Particularly, in the evaluation image 31, the resolution at which characters can be recognized in the case of using the OCR software is set as the actual reference, and an area in which characters can be stably recognized (the area of the reference color and the red-based color), and an area in which the character recognition ratio is low (the area of the blue-based color) are displayed using a difference in color based on the reference. Thus, a determination as to whether or not characters can be recognized in the case of using the OCR software is particularly easily made.

Figure 9:
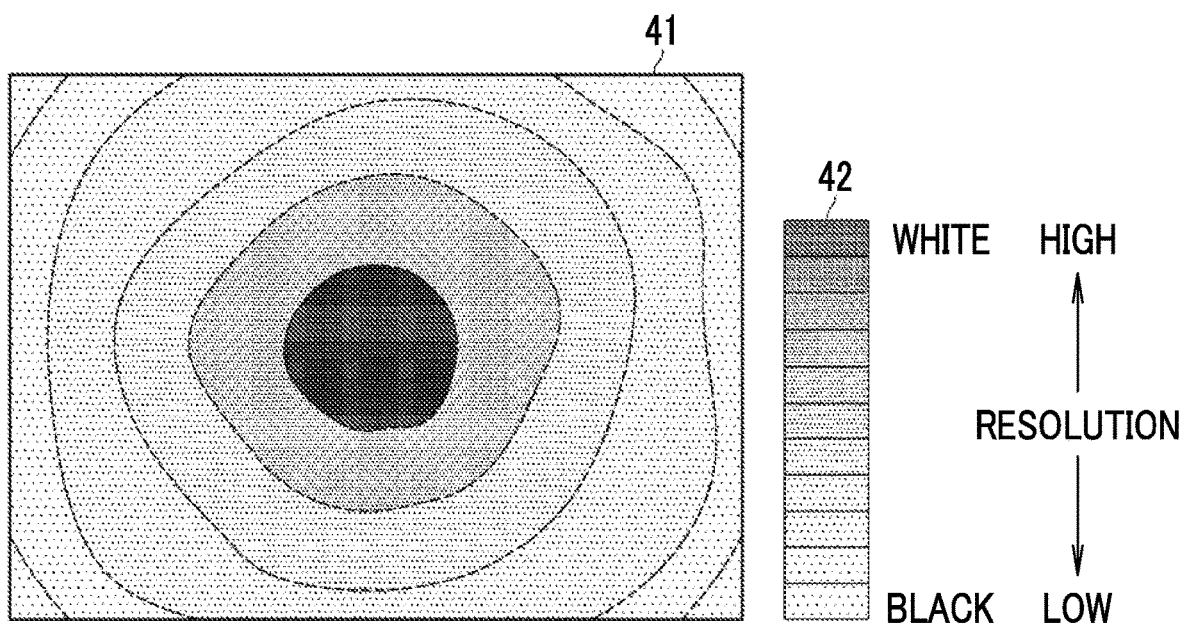
FIG. 9 is the evaluation image in a gray scale in a case where a reference color is not set.

For example, an evaluation image 41 illustrated in FIG. 9 is an image in which the resolution calculated by the evaluation unit 17 is represented as a simple gray scale 42 corresponding to the numerical value of the resolution regardless of the character recognition ratio of the OCR software. In the evaluation image 41, the resolution of the imaging unit 12 can also be found. In addition, in a case where the resolution at which characters can be stably recognized by the OCR software is known, a position on the test chart image 26 to which characters can be recognized can be more easily found than that in the related art by seeing the evaluation image 41. However, a boundary between character recognizability and character unrecognizableness is still ambiguous.

Meanwhile, in the evaluation image 31 of the embodiment, the reference color is set based on the character recognition ratio of the OCR software. Thus, a determination as to whether or not characters can be recognized in the case of using the OCR software is particularly easily made. In addition, the first color representing the area in which characters can be stably recognized, and the second color representing the area in which the character recognition ratio is low are set to be easily distinguished from each other based on the reference color. Thus, a determination as to whether or not characters can be recognized in the case of using the OCR software is particularly easily made.

Figure 10:
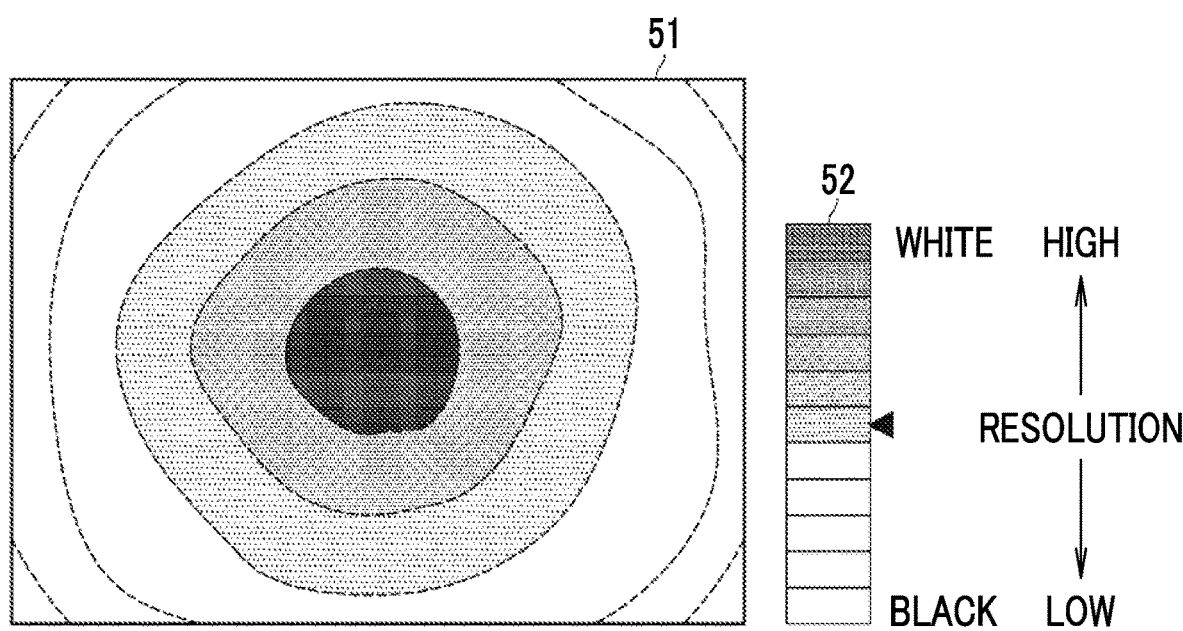
FIG. 10 is the evaluation image in a gray scale in which the reference color is set.

In the case of setting the evaluation image 31 as a gray scale, for example, a gray scale 52 in which the reference color (illustrated by a triangle mark (▲) in FIG. 10) is set for a resolution corresponding to a specific character recognition ratio of the OCR software is set like an evaluation image 51 illustrated in FIG. 10. In a case where noticeable differences in color (including light and shade) that can be identified from each other are set based on the reference color, a determination as to whether or not characters can be recognized in the case of using the OCR software can be easily made in the evaluation image 51 of the gray scale 52 in the same manner as the evaluation image 31.

Besides, since the evaluation system 10 uses the uniform test chart 11, there is an advantage such that precise positioning between the imaging unit 12 and the test chart 11 is not required. In the case of lining up and imaging a plurality of typical charts such as Siemens star charts and evaluating the imaging unit 12 using the image, positioning between the test chart 11 and the imaging unit 12 is basically needed. For example, in a case where an evaluation of the imaging center is to be obtained, the test chart needs to be imaged with the Siemens star chart or the like in the related art at its center. In a case where the position of the Siemens star chart or the like in the related art is shifted from the imaging center, the evaluation result is changed. Meanwhile, the evaluation system 10 simply needs to perform imaging with the test chart 11 approximately in its front. The reason is that the test chart 11 is uniform, and even evaluation can be performed even in a case where any part of the test chart 11 is imaged. Therefore, the evaluation system 10 can more easily evaluate the imaging unit 12 than an evaluation system in the related art.

Figure 11:
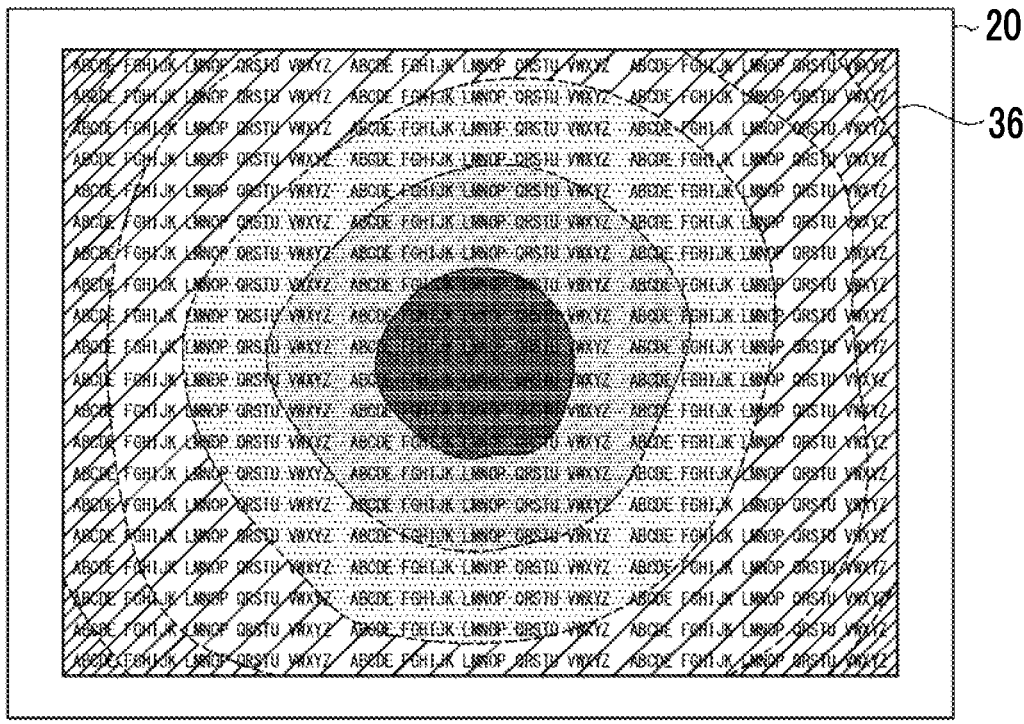
FIG. 11 is a display example of a superimposition image on which the test chart image and the evaluation image are superimposed.

In the first embodiment, the display unit 20 displays the test chart image 26 along with the evaluation image 31. The display unit 20 may display a superimposition image 36 on which the test chart image 26 and the evaluation image 31 are superimposed as illustrated in FIG. 11. The superimposition image 36 is generated by the display unit 20 in the case of displaying the test chart image 26 and the evaluation image 31. The superimposition image 36 may be generated in advance by the image generation unit 18 using the test chart image 26 and the evaluation image 31.

In the first embodiment, the area SP cut out from the test chart image 26 by the evaluation unit 17 in order to calculate the resolution may have any shape and any size, but the area SP includes at least a plurality of characters. The reason is that the evaluation result (for example, the value of the resolution) is not to be affected by the unique directivity of each character, a combination of characters itself, and the like. Particularly, in a case where the plurality of characters included in the test chart 11 are a sentence or the like and are a collection of character strings written in one direction for each line, the area SP is set to include a plurality of characters in the horizontal direction and the vertical direction. The reason is that in a case where the number of characters included in the horizontal direction or the vertical direction is small, the evaluation result is easily affected by the directivity or the like of each character. Consequently, in the evaluation image 31, the area of the reference color is scattered, and the distribution of the evaluation is not understandable.

Figure 12:
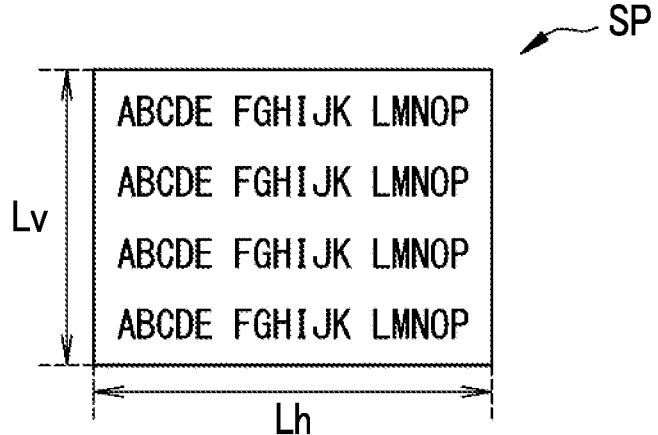
FIG. 12 is a descriptive diagram illustrating the size or the like of an area that is cut out for evaluation.
Figure 13:
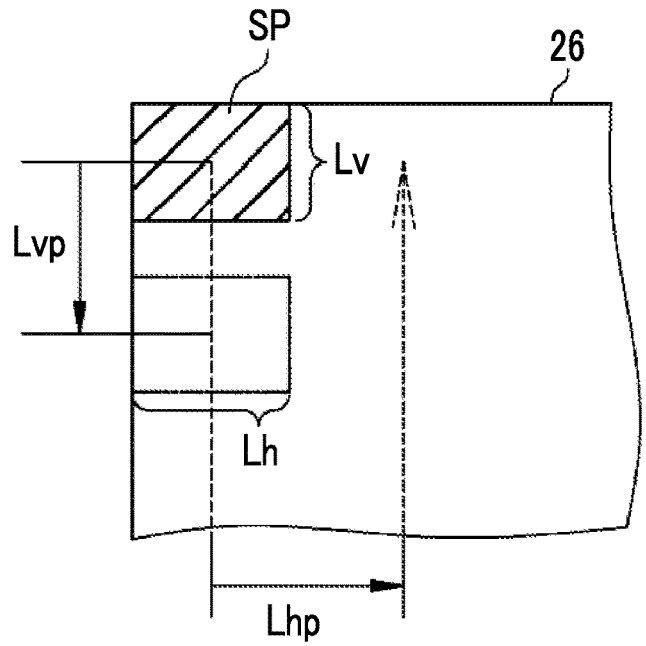
FIG. 13 is a descriptive diagram illustrating a scan pitch of the area cut out for evaluation.

For example, in a case where the test chart 11 is a collection of characters horizontally written for each line, and the area SP has an oblong shape, a length Lv in the vertical direction of the area SP is preferably a length including at least four lines or more (four characters or more in the vertical direction) of characters as illustrated in FIG. 12 and is particularly preferably a length including eight lines or more (eight characters or more in the vertical direction) of characters. In addition, a length Lh in the horizontal direction of the area SP is preferably a length including at least four or more characters and is particularly preferably a length including eight or more characters. Furthermore, as illustrated in FIG. 13, in a case where a pitch Lvp for scanning the area SP in the vertical direction and a pitch Lhp for scanning the area SP in the horizontal direction are set in the test chart image 26, it is preferable that Lvp≤Lv and Lhp≤Lh are satisfied. That is, it is preferable to scan the test chart image 26 with an overlap of at least a part of the area SP in the vertical direction and the horizontal direction. Furthermore, it is particularly preferable that Lvp≤Lv/2 and Lhp≤Lh/2 are satisfied. That is, it is particularly preferable to scan the test chart image 26 with an overlap of at least a part of ½ or more of the area SP in the vertical direction and the horizontal direction.

Figure 14:
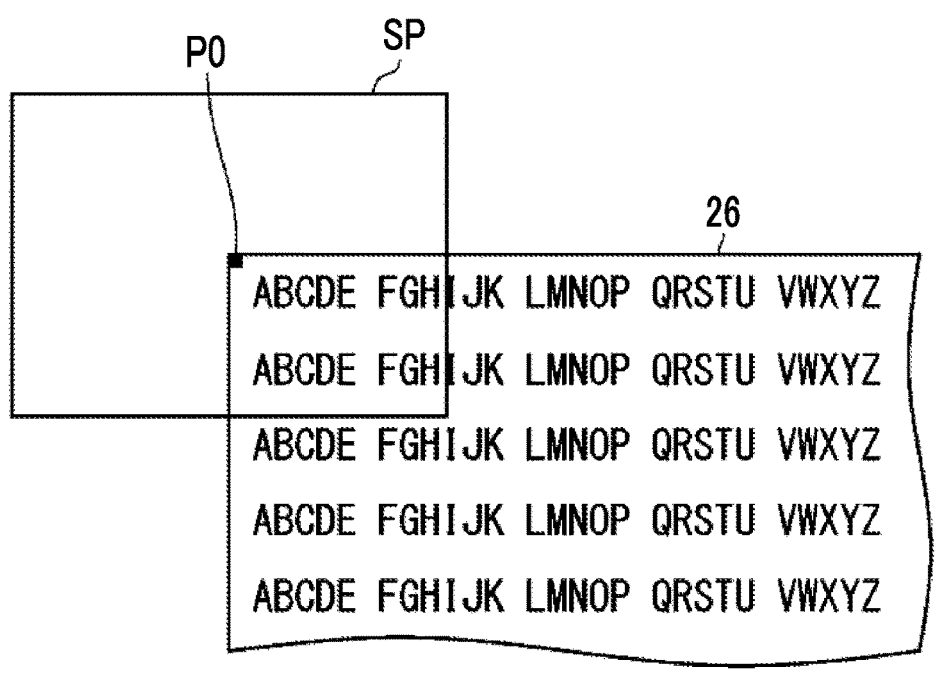
FIG. 14 is a descriptive diagram in a case where the test chart image cannot be included in the whole part of the area cut out for evaluation.
Figure 15:
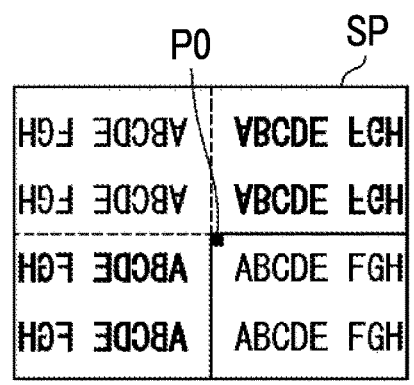
FIG. 15 is a descriptive diagram illustrating an example of filling the whole part of the area cut out for evaluation with the test chart image by performing a mirror process.

In addition, in the first embodiment, the evaluation unit 17 obtains the evaluation at the evaluation position P0 by cutting out the area SP including the evaluation position P0 at its center from the test chart image 26. However, depending on the position of the evaluation position P0 in the test chart image 26, the whole area SP may not be filled with the test chart image 26. For example, as illustrated in FIG. 14, in a case where a corner of the test chart image 26 is set as the evaluation position P0, the test chart image 26 is included in a lower right area of approximately ¼ of the area SP, but the test chart image 26 cannot be included in the upper right, upper left, and lower left areas of the area SP. In such a case, as illustrated in FIG. 15, for example, the evaluation unit 17 fills the upper right, upper left, and lower left areas of the area SP with an image acquired by performing a mirror process on a part of the test chart image 26 included in the lower right area of the area SP. By doing so, even in a case where the test chart image 26 can be included in only a part of the area SP, the evaluation unit 17 can evaluate the evaluation position P0 with the same accuracy as that in a case where the test chart image 26 is included in the whole area SP. While the area SP is filled using the mirror process in FIG. 15, the upper right, upper left, and lower left areas of the area SP may be filled by copying a part of the test chart image 26 included in the lower right area of the area SP and tiling the copied part.

In the first embodiment, the evaluation unit 17 obtains the resolution as the evaluation of the imaging unit 12 using the contrast method. The resolution may be calculated using a method such as the root mean square method or the derivation method. Besides, in a case where the evaluation unit 17 obtains the resolution as the evaluation, the evaluation unit 17 can execute character recognition on the image of the area SP cut out from the test chart image 26 using the OCR software and can use the result (such as % of characters recognized in the image) as the "resolution". In addition, in a case where the number of characters in the test chart image 26 is small in the case of obtaining the resolution using the contrast method, the resolution Rpos at the evaluation position P0 can be obtained using the maximum value of the pixel values instead of the average value Wave of the pixel values greater than or equal to the average value Aave and using the minimum value of the pixel values instead of the average value Bave of the pixel values less than or equal to the average value Aave.

Second Embodiment

In the first embodiment, the evaluation unit 17 obtains the resolution as the evaluation of the imaging unit 12. The evaluation unit 17 can also obtain an evaluation related to performance other than the resolution. For example, instead of the resolution or in addition to the resolution, the evaluation unit 17 can obtain the sharpness, the axial chromatic aberration, the lateral chromatic aberration, or the like as the evaluation of the imaging unit 12. Hereinafter, an example in which the evaluation unit 17 evaluates, as the evaluation of the imaging unit 12, the chromatic aberration (that is, at least any of the axial chromatic aberration or the lateral chromatic aberration) that is one chromatic performance of the imaging lens 13 included in the imaging unit 12 will be described.

Figure 16:
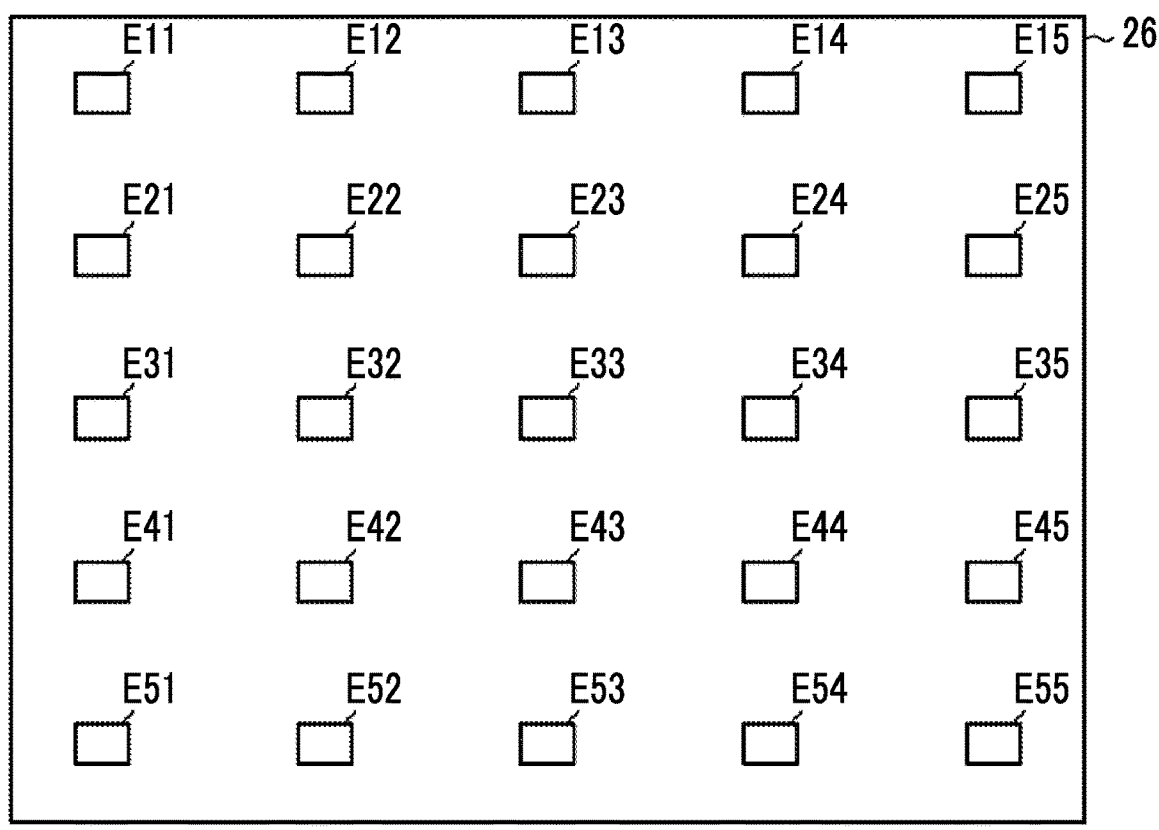
FIG. 16 is a descriptive diagram illustrating an area that is cut out from a test chart image by an evaluation unit in a second embodiment.

In a case where the evaluation unit 17 evaluates the imaging unit 12 with respect to the chromatic aberration, the evaluation unit 17 cuts out an area Eij (for example, i=1 to 5 and j=1 to 5) from the test chart image 26 as illustrated in FIG. 16. Each area Eij is a part of the test chart image 26. In addition, in the present embodiment, all areas Eij have the same shape and the same size. For example, the shape of the area Eij is a quadrangle, and the size of the area Eij is such that the characters of the test chart image 26 can be visually read. In addition, in the case of obtaining the axial chromatic aberration, the area Eij includes at least an area (hereinafter, referred to as a center area) that includes the center of the test chart image 26. In FIG. 14, the area E33 is the center area. In addition, the adjacent areas Eij are equidistant from each other in the vertical direction and are equidistant from each other in the horizontal direction in the test chart image 26.

Figure 17:
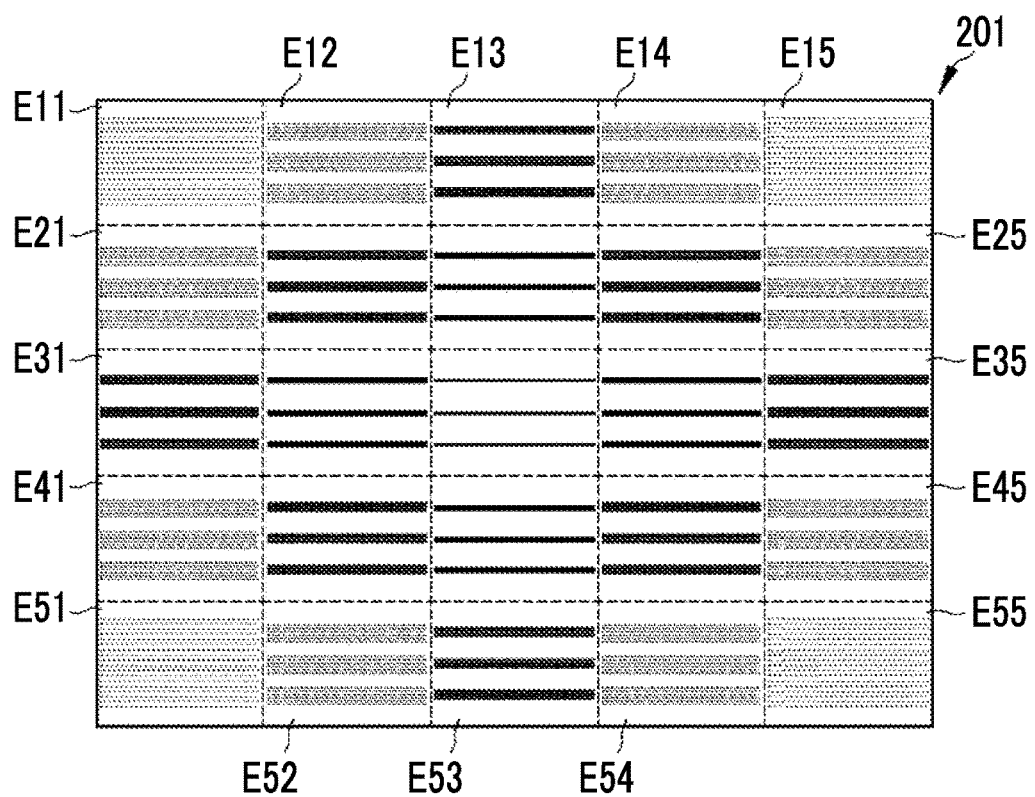
FIG. 17 is a second test chart image.

As illustrated in FIG. 17, the image generation unit 18 generates a second test chart image 201 by linking each image of the area Eij (hereinafter, referred to as an Eij image; the same applies in the case of using a specific number as the suffix i or the suffix j) cut out from the test chart image 26 in the above manner by the evaluation unit 17 without changing its positional order. The second test chart image 201 is an image in which bleeding of color (hereinafter, referred to as color bleeding) caused by the chromatic aberration is set to be visually recognized more easily than that in the test chart image 26. In addition, since the second test chart image 201 is generated using the area Eij of a part of the test chart image 26, the second test chart image 201 is also a "test chart image".

Figure 18:
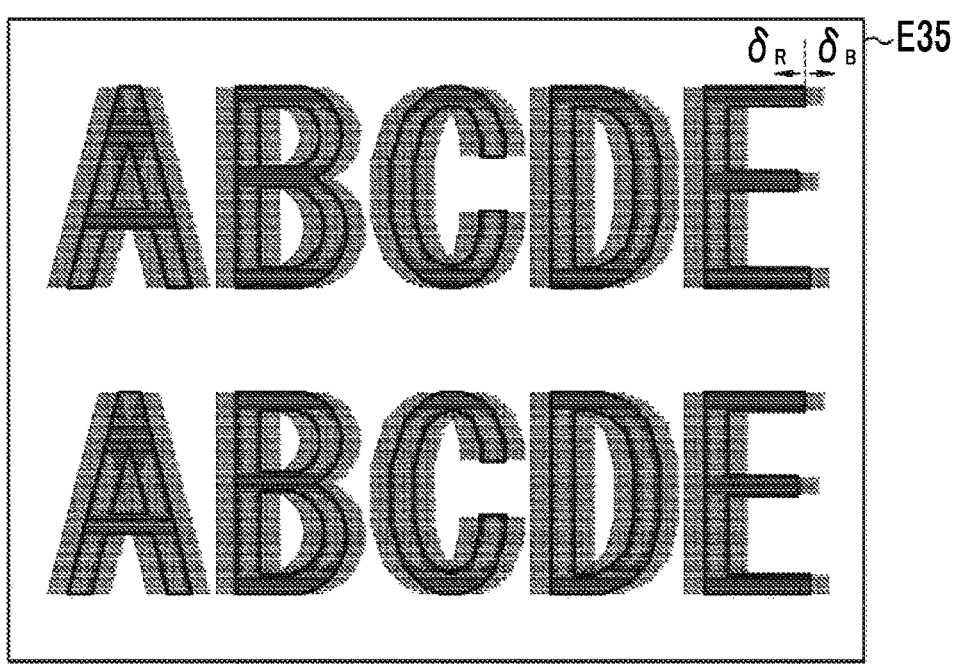
FIG. 18 is an example of an image that is cut out from the test chart image.

The evaluation unit 17 obtains the evaluation related to the chromatic aberration in the area Eij using each Eij image. In a case where the imaging unit 12 has the chromatic aberration, for example, blue color bleeding $\delta_B$ in the rightward direction and red color bleeding $\delta_R$ in the leftward direction appear in the E35 image as illustrated in FIG. 18. The evaluation unit 17 obtains the blue color bleeding $\delta_B$ and the red color bleeding $\delta_R$ using the E35 image and generates a color bleeding image $\Delta 35$ (refer to FIG. 19) that represents the directions and the magnitudes of the blue color bleeding $\delta_B$ and the red color bleeding $\delta_R$ in the area E35. The same applies to other areas Eij. The evaluation unit 17 generates each color bleeding image $\Delta ij$ from each Eij image.

Figure 19:
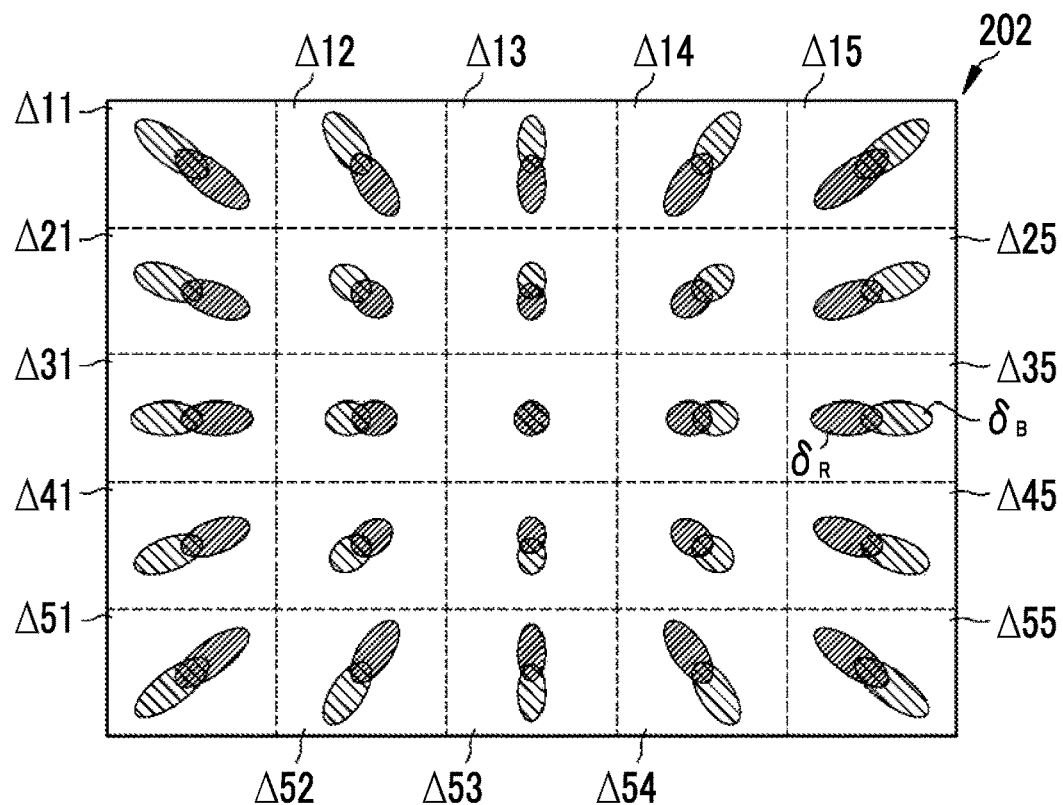
FIG. 19 is an evaluation image in the second embodiment.

As illustrated in FIG. 19, by lining up and linking the color bleeding image $\Delta ij$ extracted by the evaluation unit 17 in the same manner as the arrangement of the area Eij, the image generation unit 18 generates an evaluation image 202 in which color bleeding caused by the chromatic aberration at each position on the test chart image 26 is represented as an image. The evaluation image 202 represents the blue color bleeding $\delta_B$ in blue and represents the red color bleeding $\delta_R$ in red. Accordingly, in the evaluation image 202, the blue color bleeding $\delta_B$ and the red color bleeding $\neq 7_R$ caused by the lateral chromatic aberration of each area Eij can be seen. In addition, approximately purple color bleeding caused by the axial chromatic aberration can be seen in the center part.

Figure 20:
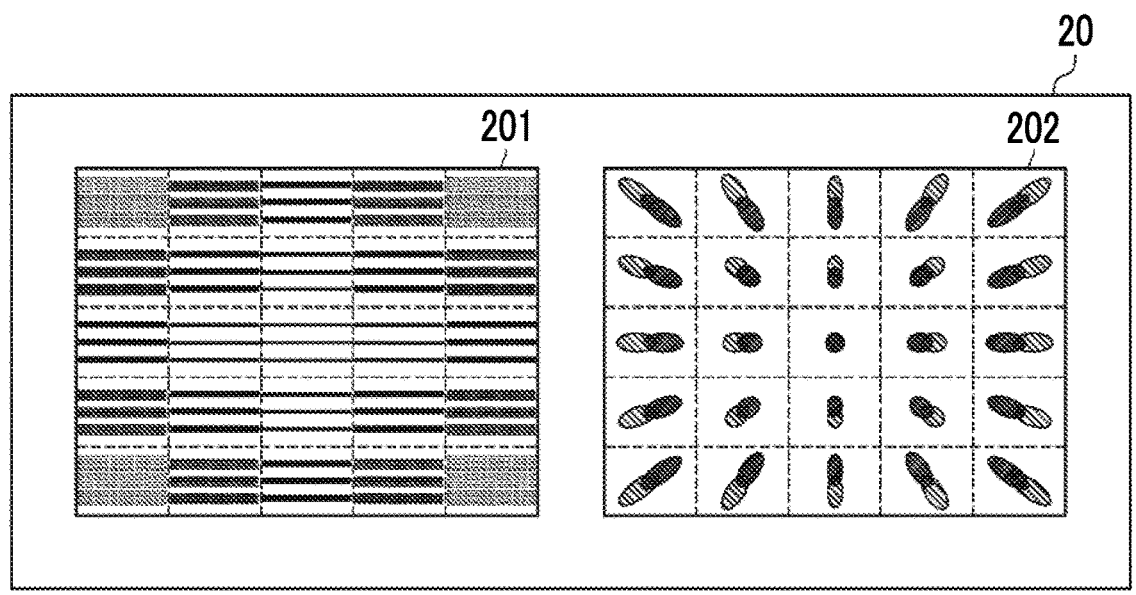
FIG. 20 is a display example in the second embodiment.

As illustrated in FIG. 20, the display unit 20 displays the second test chart image 201 along with the evaluation image 202. Thus, in the evaluation system 10, visual sensory evaluation can be performed using the second test chart image 201, and the evaluation of the evaluation system 10 with respect to the chromatic aberration can be found using the evaluation image 202. A comparison between the sensory evaluation and the evaluation of the evaluation system 10 is easily made. Particularly, each position on the evaluation image 202 corresponds to each position on the second test chart image, and the evaluation image 202 represents the extent and the direction of color bleeding caused by the chromatic aberration with the color of the color bleeding. Thus, the actual evaluation is directly perceived more easily than that in the case of comparing the graph (a so-called aberration diagram) in the related art with the test chart image 26.

Figure 21:
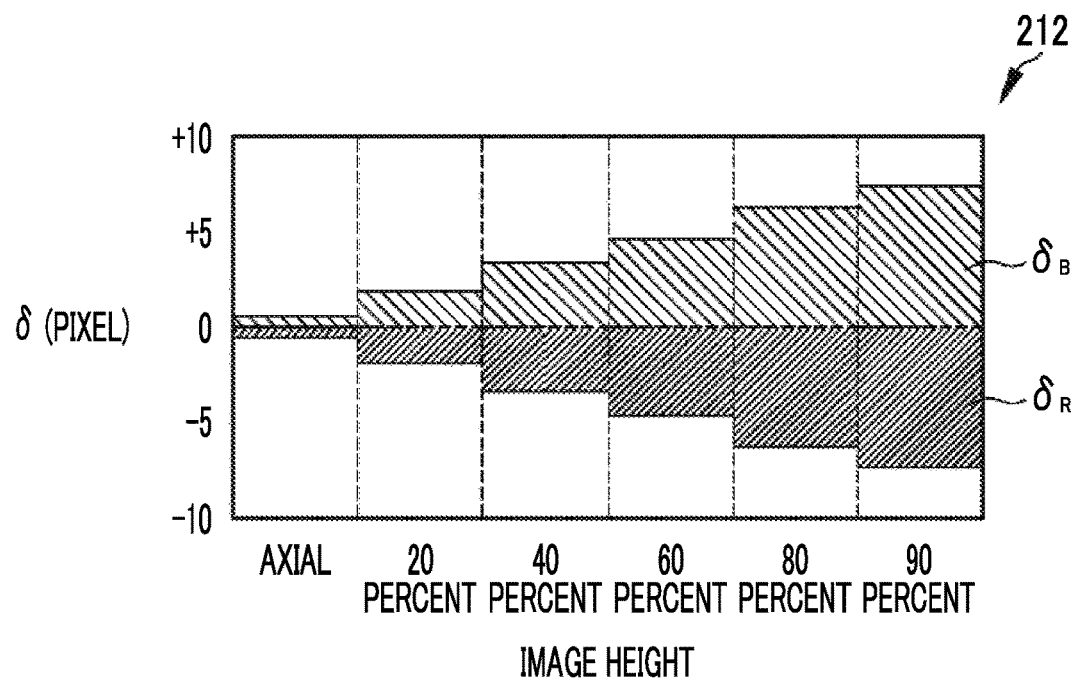
FIG. 21 is an evaluation image of a modification example of the second embodiment.

In the second embodiment, the evaluation image 202 is generated and displayed. Instead of the evaluation image 202 or in addition to the evaluation image 202, an evaluation image 212 illustrated in FIG. 21 may be generated and displayed. The evaluation image 212 represents the blue color bleeding $\delta_B$ and the red color bleeding $\delta_R$ at each image height with a horizontal axis denoting an image height (mm) and a vertical axis denoting the pixel count of the color bleeding $\delta$ (the blue color bleeding $\delta_B$ and the red color bleeding $\delta_R$). That is, the evaluation image 212 is an image that represents the magnitudes of the axial chromatic aberration and the lateral chromatic aberration with respect to the image height with a color. In the evaluation image 212, for example, the blue color bleeding $\delta_B$ at each image height is represented in blue, and the red color bleeding $\delta_R$ at each image height is represented in red.

For example, an "axial" part of the evaluation image 212 can be generated using data that is extracted in the diagonal direction (a so-called tangential direction) of the color bleeding image $\Delta 33$. In the same manner, the parts of other image heights can be generated using data that is extracted in the diagonal direction from the color bleeding image $\Delta ij$. However, in the second embodiment, the area Eij is not set in the parts of 20 percent of the image height, 40 percent of the image height, 60 percent of the image height, 80 percent of the image height, and 90 percent of the image height. Thus, in the case of generating and displaying the evaluation image 212, at least the area Eij that includes the part of the corresponding image height needs to be set in advance.

Figure 22:
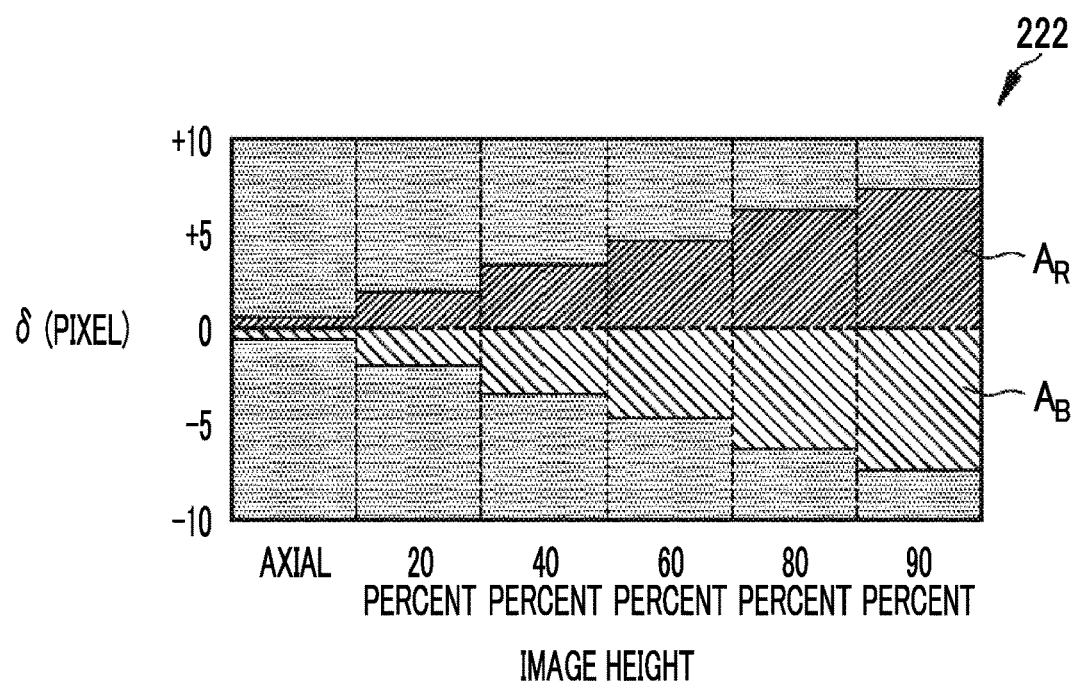
FIG. 22 is an evaluation image of a modification example of the second embodiment.

While the evaluation image 212 that represents the color bleeding in the tangential direction is generated and displayed, an evaluation image 222 in which the evaluation image 212 is displayed in complementary colors may be generated and displayed as illustrated in FIG. 22. The evaluation image 222 displays a red chromatic aberration $A_R$ and a blue chromatic aberration $A_B$. Thus, in the case of generating and displaying the evaluation image 222, the optical performance of the imaging lens 13 can be more directly displayed than that with the color bleeding.

In the second embodiment, the evaluation unit 17 evaluates the imaging unit 12 with respect to the chromatic aberration. Evaluation can also be performed for other aberrations. In this case, a specific generation method (an extraction method for data related to the aberration) for the evaluation image needs to be changed depending on the target aberration. The rest is the same as the second embodiment.

In the first embodiment and the second embodiment, in a case where the image sensor 14 used in the imaging unit 12 is a color sensor, the test chart image 26 has a red channel (R channel), a green channel (G channel), and a blue channel (B channel). Thus, the evaluation unit 17 can perform the evaluation in the first embodiment or the second embodiment for each color channel. In addition, the evaluation unit 17 can convert a signal of each color channel of the test chart image 26 into a brightness signal and then, can perform the evaluation in the first embodiment or the second embodiment using the brightness signal. That is, the evaluation unit 17 can convert the test chart image 26 into a monochrome image and use the monochrome image for evaluation. For example, the brightness signal is calculated in accordance with "brightness signal=0.2×R channel+0.7 G channel+0.1 B channel".

Figure 23:
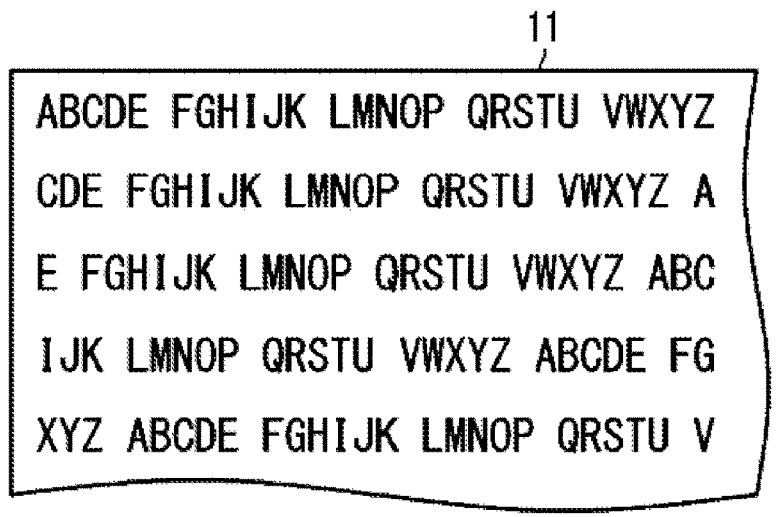
FIG. 23 is a test chart having improved randomness.

In the first embodiment and the second embodiment, the plurality of characters included in the test chart 11 are random. The plurality of characters included in the test chart 11 may have regularity such as periodicity in a case where the test chart 11 as a whole can be regarded as being random. For example, the test chart 11 can be formed by repeatedly lining up a character string "ABC . . . XYZ" in which alphabets are arranged in the alphabetical order (refer to FIG. 2). In a case where the plurality of characters included in the test chart 11 have regularity, the randomness of the test chart 11 as a whole can be improved by phase shifting. For example, as illustrated in FIG. 23, in the case of repeating the character string "ABC . . . XYZ", the randomness of the whole test chart 11 is improved by setting different characters to be lined up at the left end of the test chart 11 by shifting the phase of the repetition of the character string.

Figure 24:
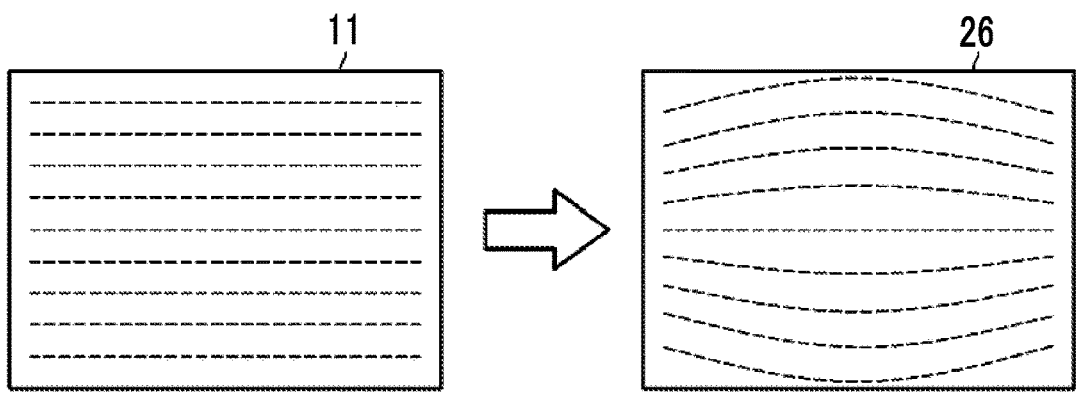
FIG. 24 is a descriptive diagram related to a distortion in the test chart image.
Figure 25:
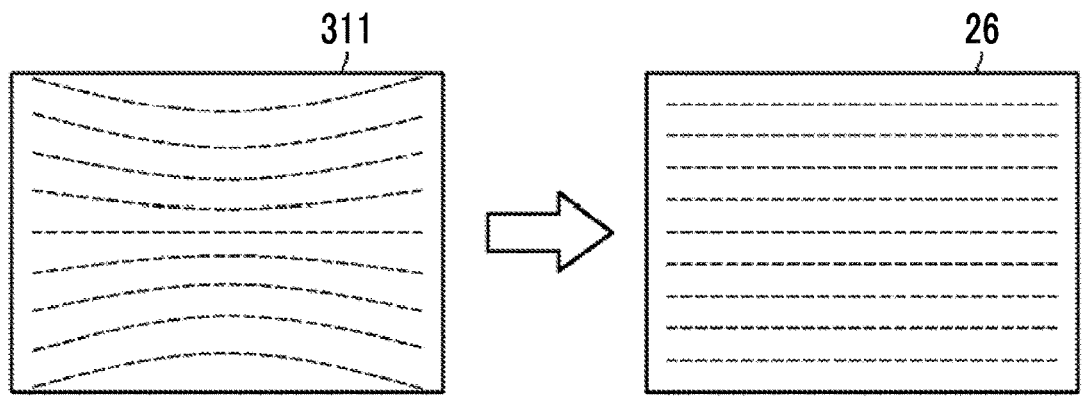
FIG. 25 is a test chart in which the arrangement of characters is adjusted.

In the first embodiment and the second embodiment, in a case where a distortion of the imaging lens 13 or a distortion in the test chart image 26 caused by the inclination or the like of installation of the test chart 11 and the imaging unit 12 is known in advance, the distortion in the test chart image 26 can be reduced by adjusting the arrangement of the plurality of characters (including the adjustment of the directions and the sizes of the characters) included in the test chart 11. For example, in a case where the imaging lens 13 is a fisheye lens or the like, and it is known that a distortion having a barrel shape occurs in the test chart image 26 in the case of imaging the test chart 11 in which the plurality of characters are horizontally lined up as illustrated in FIG. 24, the distortion in the test chart image 26 can be reduced using a test chart 311 in which the arrangement of the plurality of characters is modulated into a pincushion shape as illustrated in FIG. 25.

Figure 26:
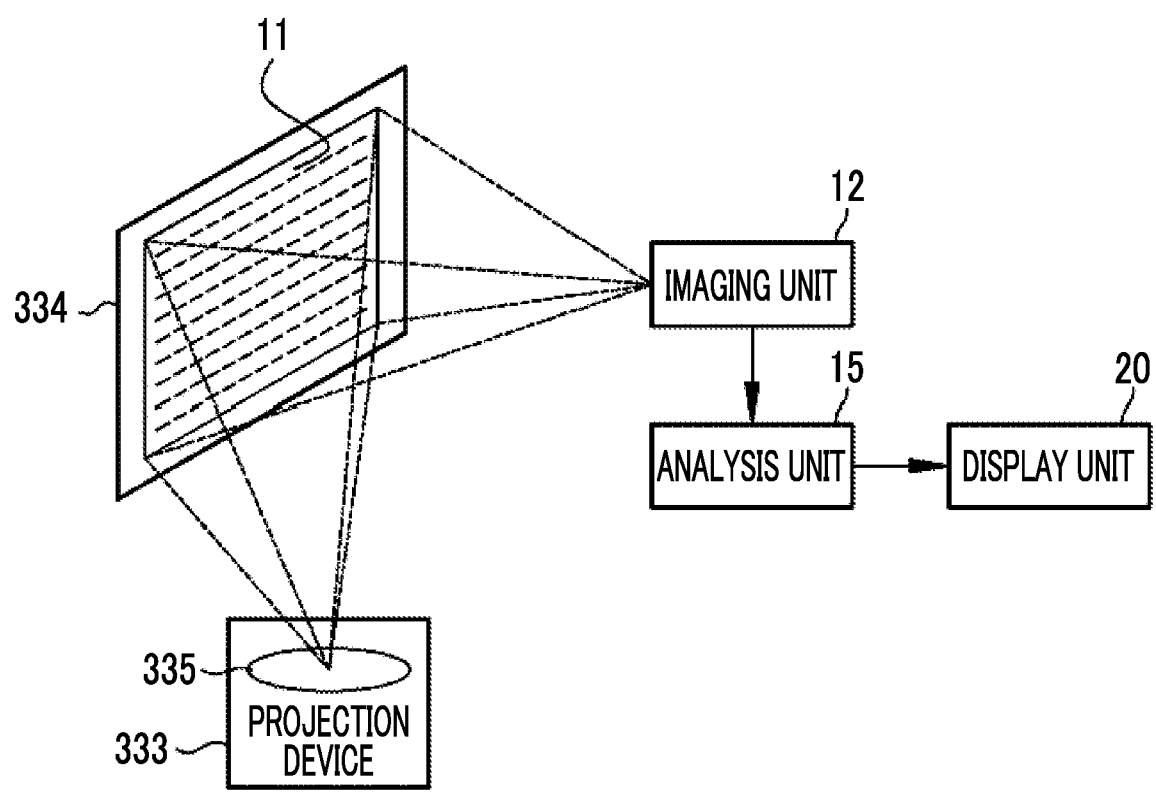
FIG. 26 is an evaluation system that displays the test chart using a projection device.

In the first embodiment, the second embodiment, and the modification example, a general reflective chart or a transmissive chart can be used as the test chart 11. Besides, the test chart 11 may be an image that is projected to a display device such as a liquid crystal display. In addition, the test chart 11 may be an image that is projected to a screen using a projection device such as a projector. In the case of using the display device or the projection device, the plurality of characters included in the test chart 11 are easily changed or adjusted. That is, in the case of using the display device or the projection device, the font, the size, the color, the direction, or the arrangement of the plurality of characters included in the test chart 11 or a combination or the like of the characters can be easily changed or adjusted. For example, the test chart 11 can be easily set as the test chart 311. In addition, as illustrated in FIG. 26, in the case of using the test chart 11 that is projected to a screen 334 using a projection device 333, the evaluation unit 17 can evaluate the performance of a projection lens 335 mounted in the projection device 333 in a case where the imaging unit 12 having known performance or the like of its each unit is used. An evaluation method or the like is the same as that in the first embodiment or the second embodiment.

EXPLANATION OF REFERENCES

10: evaluation system
11, 311: test chart
12: imaging unit
13: imaging lens
14: image sensor
15: analysis unit
16: input unit
17: evaluation unit
18: image generation unit
19: reference color setting unit
20: display unit
26: test chart image
31, 41, 51, 202, 212, 222: evaluation image
32: color scale
36: superimposition image
42, 52: gray scale
201: second test chart image
333: projection device
334: screen
335: projection lens
SP: area cut out for evaluation
Lv: length in vertical direction of area SP
Lh: length in horizontal direction of area SP
Lvp: scanning pitch in vertical direction of area SP
Lhp: scanning pitch in horizontal direction of area SP
Eij (E11 to E55), SP: area
P0: evaluation position
$\Delta ij$ ($\Delta 11$ to $\Delta 55$): color bleeding image
$\delta_B$: blue color bleeding
$\delta_R$: red color bleeding
$A_B$: blue chromatic aberration
$A_R$: red chromatic aberration

What is claimed is:

1. An evaluation system comprising:
a processor configured to:
input a test chart image acquired by imaging a test chart including a plurality of characters;
evaluate performance of camera using the test chart image; and
generate an evaluation image representing an evaluation at each position on the test chart image with a color; and
a display, configured to display the evaluation image along with the test chart image or in a superimposed manner on the test chart image.

2. The evaluation system according to claim 1, wherein the processor evaluates the performance of the camera using a character that has a constant line thickness among the plurality of characters included in the test chart image.

3. The evaluation system according to claim 1, wherein the processor evaluates the performance of the camera in a case where the plurality of characters included in the test chart image are random.

4. The evaluation system according to claim 1, wherein the processor evaluates the performance of the camera in a case where the test chart in the test chart image is in a gray scale.

5. The evaluation system according to claim 1, wherein the processor evaluates a resolution of the camera.

6. The evaluation system according to claim 5, wherein the evaluation image shows a part having a higher resolution than a reference resolution or a part having a lower resolution than the reference resolution by representing a part having the reference resolution with a specific color and representing the part having the higher resolution than the reference resolution or the part having the lower resolution than the reference resolution with a color different from the specific color.

7. The evaluation system according to claim 6, wherein the processor sets the reference resolution based on a character recognition ratio of optical character recognition software, and
the evaluation image represents at least a part in which a character is recognizable, and a part in which a character is not recognizable with different colors in a case of recognizing the characters included in the test chart image using the optical character recognition software.

8. The evaluation system according to claim 1, wherein the processor evaluates chromatic performance of a lens included in the camera.

9. The evaluation system according to claim 8, wherein the processor generates the evaluation image in which color bleeding caused by a chromatic aberration at each position on the test chart image is represented as an image.

10. The evaluation system according to claim 8, wherein the processor generates the evaluation image that represents magnitudes of an axial chromatic aberration and a lateral chromatic aberration with a color with respect to an image height.

11. The evaluation system according to claim 1, further comprising:
   the camera that images the test chart image to be input to the processor.
12. The evaluation system according to claim 1, further comprising:
   the test chart that includes a plurality of characters.
13. The evaluation system according to claim 12,
   wherein the characters included in the test chart have a constant line thickness.
14. The evaluation system according to claim 12,
   wherein the plurality of characters included in the test chart are random.
15. The evaluation system according to claim 12,
   wherein a color of the plurality of characters included in the test chart is a single color.
16. An evaluation method comprising:
   a step of inputting a test chart image acquired by imaging a test chart including a plurality of characters by an input unit;
   a step of evaluating performance of an imaging unit using the test chart image by an evaluation unit;
   a step of generating an evaluation image representing an evaluation of the evaluation unit at each position on the test chart image with a color by an image generation unit; and
   a step of displaying the evaluation image along with the test chart image or in a superimposed manner on the test chart image by a display unit.

* * * * *